United States Patent [19]

Gronert et al.

[11] Patent Number: 4,791,963

[45] Date of Patent: Dec. 20, 1988

[54] FLEXIBLE TUBE WITH MUTUALLY PARALLEL, RING-SHAPED FLUTES AND AXIAL SUPPORT

[75] Inventors: Heinz Gronert, Emmering; Johann Benisch, Herrsching; Johann Pichler, Steinkirchen; Reinhard Gropp, Neuenburg-Arnbach, all of Fed. Rep. of Germany

[73] Assignee: Witzenmann GmbH Metallschlauch-fabrik Pforzheim, Pforzheim, Fed. Rep. of Germany

[21] Appl. No.: 897,523

[22] PCT Filed: Feb. 1, 1986

[86] PCT No.: PCT/EP86/00049

§ 371 Date: Jul. 15, 1986

§ 102(e) Date: Jul. 15, 1986

[87] PCT Pub. No.: WO86/04660

PCT Pub. Date: Aug. 14, 1986

[30] Foreign Application Priority Data

Feb. 4, 1985 [DE] Fed. Rep. of Germany ....... 3503689
Jun. 22, 1985 [DE] Fed. Rep. of Germany ....... 3522334
Dec. 18, 1985 [DE] Fed. Rep. of Germany ....... 3544884

[51] Int. Cl.4 ..................... F16L 27/10; F16L 51/02
[52] U.S. Cl. .................................... 138/110; 138/106; 138/121; 138/172; 138/178; 285/114; 285/226
[58] Field of Search .............. 138/103, 106, 107, 110, 138/118, 120, 172, 177, 178, 121; 285/114, 226

[56] References Cited

U.S. PATENT DOCUMENTS

| 1,971,928 | 8/1934 | Zallea | 138/121 X |
| 2,707,117 | 4/1955 | Fentress et al. | |
| 2,748,803 | 6/1956 | Guarnaschelli | |
| 2,894,535 | 7/1959 | Hansen | 138/121 |
| 3,006,662 | 10/1961 | Katsuhara | 138/121 X |
| 3,060,972 | 10/1962 | Sheldon | 138/120 |
| 3,162,214 | 12/1964 | Bazinet | 138/120 |
| 3,842,865 | 10/1974 | Torricelli | 138/121 |
| 4,470,433 | 9/1984 | Vipond et al. | 138/106 |
| 4,497,342 | 2/1985 | Wenzel et al. | 138/106 X |
| 4,686,963 | 8/1987 | Cohen et al. | 138/120 X |

FOREIGN PATENT DOCUMENTS 2080195 11/1971 France .
2015689 9/1979 United Kingdom .

Primary Examiner—James E. Bryant, III
Attorney, Agent, or Firm—Frishauf, Holtz, Goodman & Woodward

[57] ABSTRACT

A flexible tube (1) has mutually parallel ring-shaped flutes, end connectors (2) and longitudinal support cables (4, 5, 102) which hold said connectors against changes in axial spacing, and are rigidly joined to the connectors in the direction of pull and/or pressure, and against which the tube is at least indirectly braced. The longitudinal cables are held on the tube by rings (104) that ensure the radial relative position between tube (1) and cables (4, 5, 102) and hold the cables while the tube (1) is guided along these rings via the cables. The rings are formed by two ring segments, each of which has a hole (109) at the respective segment end to retain the cables therein.

14 Claims, 12 Drawing Sheets

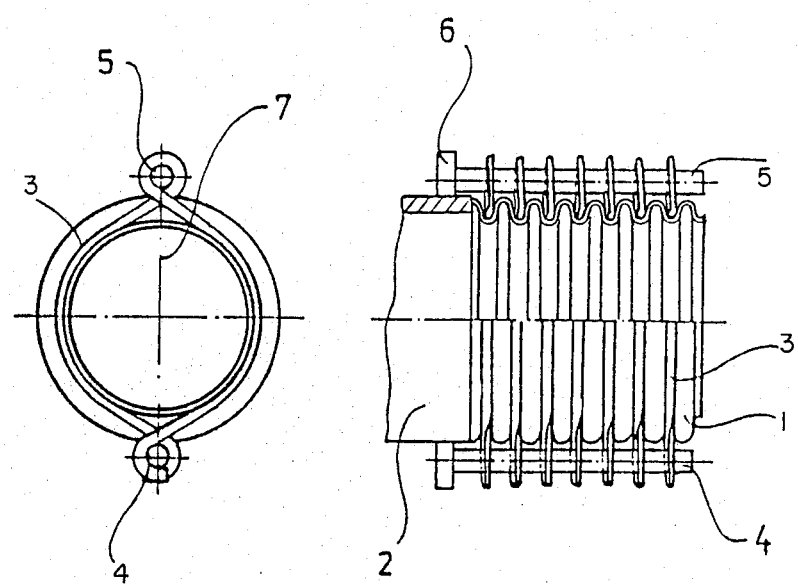
Fig. 1
Fig. 2
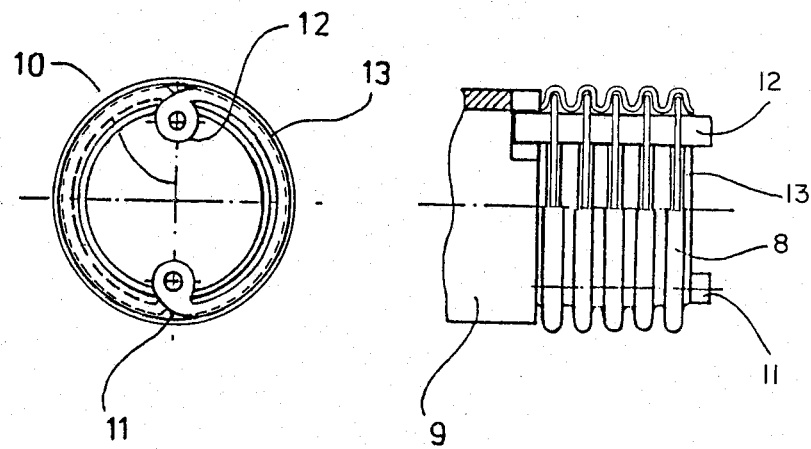

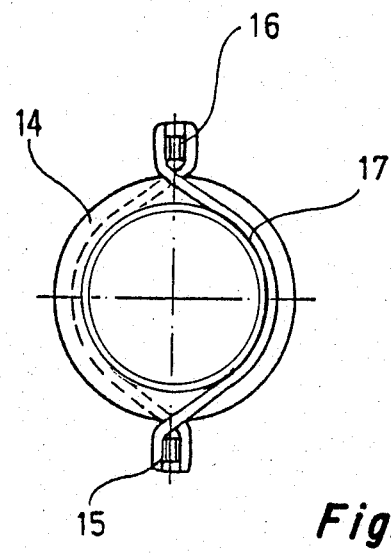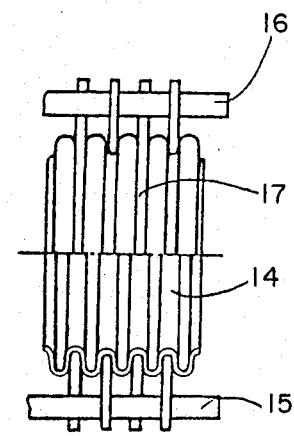
Fig. 3
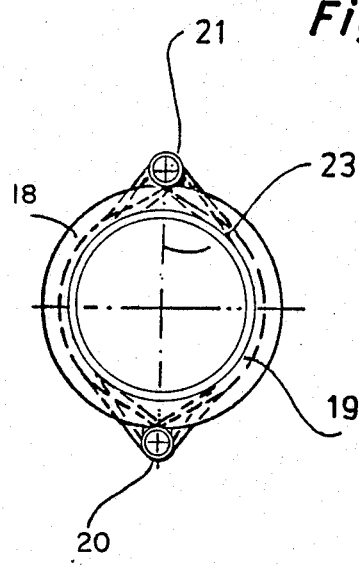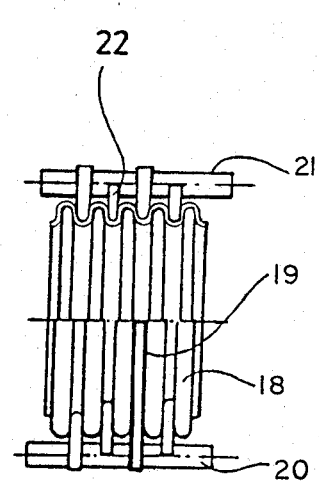
Fig. 4

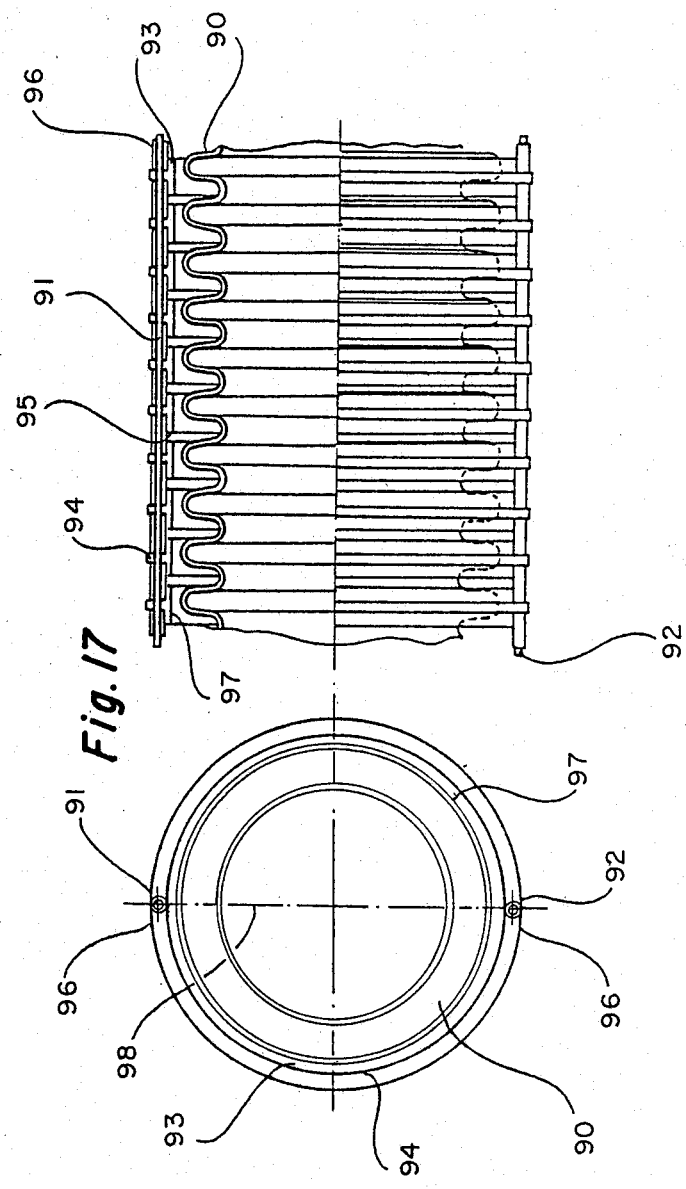

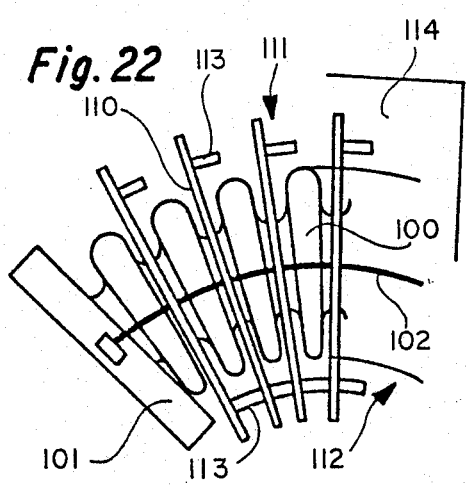
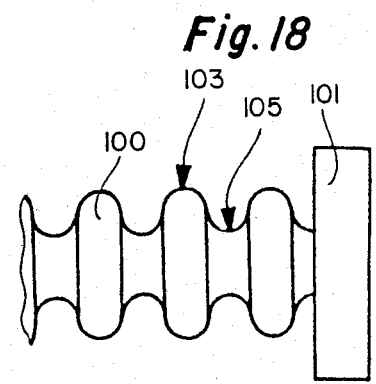
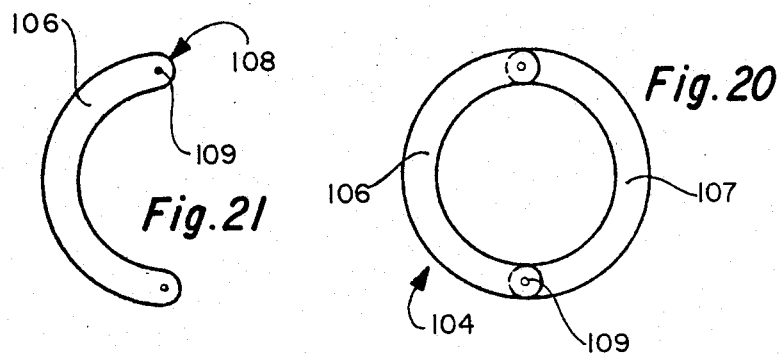
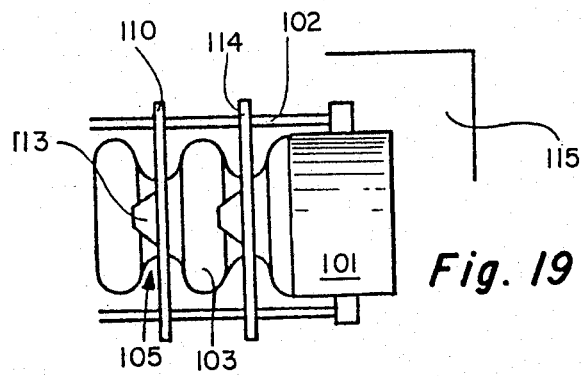

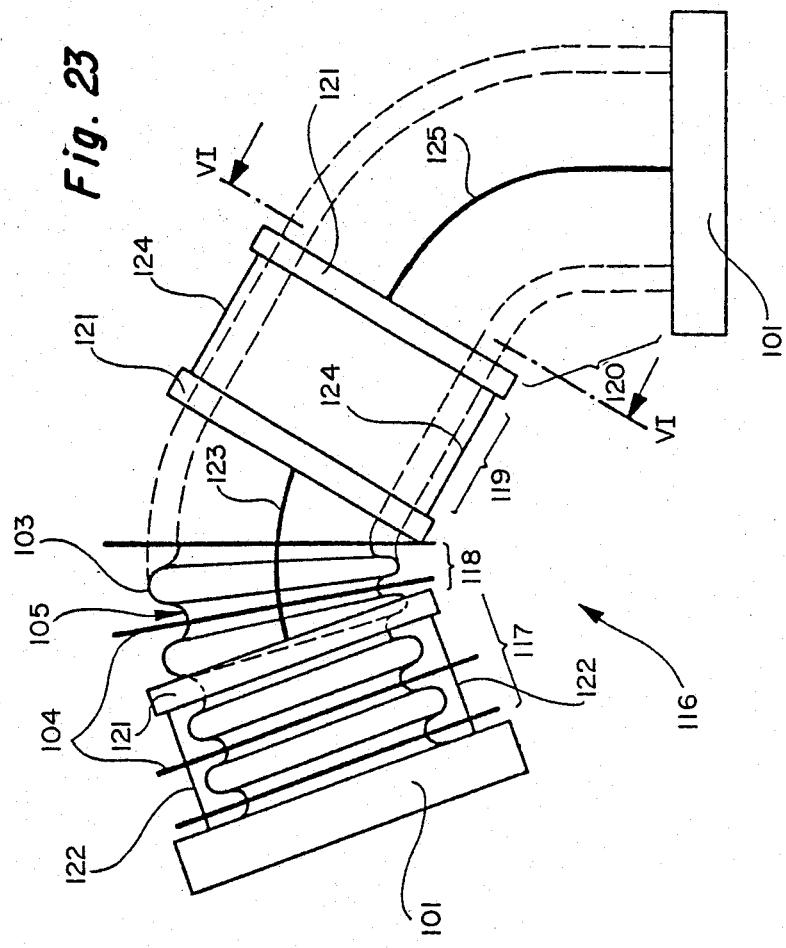

FLEXIBLE TUBE WITH MUTUALLY PARALLEL, RING-SHAPED FLUTES AND AXIAL SUPPORT

The invention relates to a flexible tube with mutually parallel, ring-shaped flutes, end connectors and longitudinal support means which hold said connectors against changes in axial spacing and which are rigidly joined to the connectors in the direction of pull and/or pressure, and against which the tube is at least indirectly braced.

When the term "ring-shaped" is used in this context, it means not necessarily a circular design, but may also refer, for example, to a tube of oval or similar cross-section. As far as the term "holding against a change in axial distance" is concerned, this is not to be understood in the absolute sense, but it allows for unavoidable elasticity, etc., while the longitudinal support means are an attempt to prevent a change in axial spacing as much as possible.

BACKGROUND

Tubes of this type, also referred to as accordion-tubes, are usually made of metal. But depending on the application, other materials, particularly plastic, are possible as well. The tubes normally serve the purpose of providing a flexible link between two medium-carrying parts to which they are connected. When the medium has more than atmospheric pressure, the tube is forced to expand in length, so that it is necessary to use additional means to keep the axial longitudinal spacing of the tube connectors and to brace the tube against buckling or lateral breakout.

For this purpose the tube is provided with steel wire braiding that is rigidly joined to the connectors. Such an external braiding reduces the tube's diameter as it expands longitudinally, but it is unable to do so when it lies closely adjacent to the corrugated tube, and thus it braces the tube connectors against a change in spacing.

However, contact between corrugated tube and braiding leads to considerable friction resulting in tribological stress for both parts, thus significantly reducing the achievable stress reversals under bending load. Essentially this results in wear causing a reduction of the tube's wall thickness, the formation of notches at the tube's outer rims, and a reduction in the braiding wire's diameter; it also results in friction causing a change in the elastic line and the neutral flexural fiber, leading to local overloading.

To limit the above described disadvantages of corrugated tubes with external braiding, numerous attempts have been made to reduce frictional stress effects resulting from interaction between the corrugated tube and braiding. These attempts consisted mainly in using lubricants, in selecting suitable materials with low friction properties, in designing appropriate surfaces in the interaction areas, and in interspersing materials that could be consumed by wear. All these efforts lead to considerable improvements, but they do not provide a life expectancy that under reversed bending stress would even remotely approach the life expectancy of, for example, a corrugated tube without a mantle of braiding.

INVENTION

It is therefore the object of the invention to design a tube of the type mentioned above such that the tribological stress of all component parts is virtually eliminated, i.e. that each part can reach its own full life expectancy without impairment by friction and thus by wear caused by other parts in terms of the stress it has to absorb, especially in terms of reversed bending stress. The means for achieving this goal must not increase the production costs of the tube, on the contrary, they should reduce costs, since additional means previously required to combat wear, such as extra components, material, etc. can be eliminated.

Briefly according to the invention this can be achieved by the longitudinal support being designed as at least one flexible cable that runs largely parallel to the tube. The radial relative position between tube and cable is determined by spacers holding the cable at distances along the length of the tube. The tube is guided in radial direction by the cable.

The term "flexible cable" has been chosen for the sake of simplicity to represent any type of component that would facilitate the absorption of force in longitudinal direction in this case. Thus the "cable" could be a rope, a bunch of wires or fibers, a flexible rod, a tape or bundle of tapes, a link chain, an articulated assembly of bar-shaped chain links which can have bending strength themselves, etc.

The arrangement according to the invention ensure first of all that the cable or cables maintain the distance of the tube connectors given in longitudinal direction of the tube. This is best illustrated in the case where the cable or cables are arranged in the neutral plane of the tube, i.e. where they have a position in which no change in length occurs independently of the tube's bending angle. But examples are given below of an arrangement outside the neutral plane as well.

If the cable or cables are bent exclusively in the neutral plane, no relative movements occur here in relation to the corrugated tube, neither in longitudinal nor in peripheral direction, so that in principle there can be no friction and wear as is the case with known metal wire braidings in all areas outside the neutral plane.

To allow the cable or cables to retain their desired relative position to the tube, especially their position in the neutral plane, during all tube movements, spacers holding the cable or cables are provided in relation to which the cable or cables do not perform relative movements that cause wear. According to another feature of the invention, it is ensured that the tube is directly or indirectly guided in radial direction by the cable or cables, so that it is held by the cable or cables against buckling or lateral breakout, while—as the following will illustrate—there is no relative movement by the other components that could cause friction and wear of the tube, so that the tube can reach its full life expectancy under reversed bending stress.

Finally, the invention provides for even distribution of the movements that result from the bending of the tube and that extend over its entire length, since—in comparison with the known case of metal braiding—no local obstacles caused by friction can occur that could hinder the tube locally in its free movability and in the even distribution of movements along the entire length of the tube.

The invention is not limited to applications regarding tubes charged with internal pressure which have a tendency of enlarging lengthwise under their pressure load, although that is the main application. It is also possible to apply this principle to tubes charged with external pressure which have the tendency of reducing their length. However, in this case there are limits to the level of pressure load, determined largely by the buckling resistance of the cable or cables and by the overall length of the tube construction. Yet if the cables are, for example, designed as flexible bars, it becomes apparent that they would be able to absorb a pressure load in a useful range in connection with guidance provided by the spacers.

It is possible to arrange the cable concentrically to the tube axis. This ensures the flexibility of the tube on all sides, since the cable always lies in the neutral plane.

If several cables are provided, it is practical to arrange these symmetrically around the tube axis, and the most advantageous version—especially with two cables—is to arrange the cables in the neutral plane.

In a case where a cable is arranged concentrically to the tube axis, the spacers can be designed as cross pieces, cross ties, etc., set into and/or onto the tube flutes, clasping the cable at their centers and holding it in their concentric position and bracing the tube at the cable, or the tube can be "suspended" from the cable via the spacers against lateral buckling.

The design can be such that the cross pieces are arranged largely between two mutually diametrical sectors of the tube, and such that in longitudinal direction of the tube adjoining cross pieces are arranged such that they are turned at an angle of 90° in relation to each other. This special arrangement in which, of course, the angle of the cross pieces must be maintained, serves mainly the purpose of easier assembly because the cross pieces can be inserted by slightly tilting them in relation to the longitudinal direction of the cable into the interior cross-section of the conduit where they can be set up in place which establishes the contact connection with the contour of the tube. To facilitate the tilting of the cross pieces in relation to the cable, the cross pieces can in an advantageous version clasp the cable such that play remains which can be preselected such that on the one hand the cross pieces have sufficient tiltability while on the other hand there is no impairment of the concentric guidance of the cable.

When two or more cables are arranged inside the tube, between them cross pieces can be arranged as spacers which hold the cables with their ends and are secured against displacement in axial direction. These spacers can in case of cables arranged in the neutral plane extend through the tube's cross-section, either diametrically or—if the spacers have a semicircular shape—by being placed in and/or on the tube flutes, secured against displacement in axial direction of the tube. The above named diametrically extending cross pieces can, for example, be secured against axial displacement by means of spacer sockets pushed onto the cables.

In both cases, the cables can abut radially outside against the interior contour of the tube. But it is also possible to provide spacers for radial distancing between cables and tube wall, and such spacers can be formed by cross pieces.

In another construction with cables arranged within the tube's cross-section the spacers can be designed as externally cylindrical rings whose external contour is preferably slightly smaller than the interior contour of the tube, and that the rings are placed at a mutual distance onto the cable or cables, secured against axial displacement. The mutual distance of the rings can be secured by spacers, etc., arranged on the cable or cables between the rings. Thus in this construction, inside the tube an articulated cylinder is set up whose exterior contour corresponds to that of the interior contour of the tube, if need be at a slight distance. The mutual axial distance of the rings forming the link-shaped cylinder determines or limits the flexibility of the tube, but on the other hand any tribological stress between the inside of the tube and the outside of the rings has been avoided.

The above examples show already that the principle according to the invention is based on the tube having a support structure that is flexible and designed such that bending movements of the tube do not result in relative movements between parts of the support structure and the tube, which means that tribological stress cannot occur.

Thus far, solutions according to the invention have been addressed in which cables and spacers are arranged inside the cross-section of the tube. This, of course, reduces the free cross-section of the tube, a potential disadvantage. Therefore designs will now be considered which provide for two or more cables outside the tube. Once again, it is practical to arrange the cables in the neutral plane. However, in principle this is not always necessary. Some designs are described which do not require this feature.

With cables arranged outside the tube, the spacers according to the invention are designed as rings or ring segments that captively encompass the tube and the cables, and formed with aligned holes for the cables. These rings or ring segments can be placed into or onto the tube flutes secured against displacement in axial direction of the tube, and said securement against axial displacement can be achieved by adapting the contours of the rings to the contours of the corresponding tube section. In each case the spacers ensure the defined mutual fastening of tube and cables without the possibility of friction between individual components, so that tribological stress and the resulting state-of-the-art effects are avoided.

The rings or ring segments can be stiff and self-supporting. But it is also possible to design the rings or ring segments as slack looping means, and in both cases spacers can be provided between cables and tube to form the radial distance. In this case, too, it is possible for the spacers to be formed by the rings or ring segments themselves.

According to a different construction, in the case of two cables, the rings or ring segments can be internally cylindrical; their internal contour is slightly larger than the external contour of the tube, and the rings or ring segments are placed onto the cables, secured against axial displacement at a mutual distance. The mutual distance of the rings can, for example, be obtained by spacers, etc., arranged on the cables between the rings. Similarly to the associated, above described construction for the interior of the tube, an articulated channel is provided around the tube in this case, whose internal cross-section corresponds to the external cross-section of the tube, if necessary with a slight distance, and the tube is freely movable axially inside the channel. The flexibility of this articulated channel and thus of the tube is given by the mutual axial distance of the rings, and here, too, relative movements between the rings of the articulated channel and the tube are prevented during bending movements.

As far as the above mentioned ring segments are concerned, it is not necessary in principle that these surround the entire tube. It is also possible, for example, to provide semicircular ring segments arranged alternately adjacent to each other in reverse order.

If the ring segments form a full loop around the tube, adjoining ends of mutually associated ring segments can be connected to each other by welding, positive interlocking or form-fitting, flanged clamps or clamp straps and other joining means. In many of the above named constructions the rings or ring segments can be designed as disks, but they can also be formed by wire, etc., with a circular cross-section.

In another construction according to the invention in keeping with the above mentioned approach, further ring-shaped or ring segment-shaped retaining elements are arranged in axial direction of the tube, centrally between adjoining rings or ring segments, and said retaining elements loop around and hold mutually opposite cables at a radial distance from the tube axis greater than the rings or ring segments, the internal contour of the retaining elements contains a distance in relation to the radially adjoining tube wall, and the retaining elements are secured against movement in axial direction of the tube with which the retaining elements may be rigidly connected via the cables—which incidentally can also be the case in the other above described constructions—, or for which the retaining elements may be partly sunk into a radially adjoining flute valley of the tube. If in the above described construction four cables are symmetrically arranged about the tube axis, pairs of retaining elements can be provided whose one retaining element loops around and holds cables turned at an angle of 90° in relation to the other element, while each retaining element is freely movable radially to the tube axis in relation to cables not held by it. In this case, too, it is possible for the retaining elements to be disk-shaped.

In this solution according to the invention, the cables run in flute-like fashion at variable radial distances to the tube, which has the result that the tube can be bent in any direction, since with cables lying outside the neutral plane, the retaining elements may shift radially in relation to the tube, such that a cable arranged on the outside of a tube's bend can "lengthen" by extending its distance to the tube's connectors and straightening its fluted course, while a diametrically opposite cable is "shortened" by the radial shift of the retaining elements, being forced into a more fluted course. But all of this takes place without the necessity of much friction between participating components. Some minor friction may occur between the retaining elements and the flute flanks when the retaining elements are secured against axial displacement by these flute flanks. But if the retaining elements are rigidly connected to the cables, even this minor friction can be prevented, since contact the retaining elements and the tube is not necessary for the above described function.

As far as the connection between the cables and the tube connectors is concerned, this can, of course, be a final, i.e. perfect connection. However, suitably, the cables can be releasably attached at the tube connectors and fastened such that they can be readjusted in terms of their length if necessary, thus adjusting the axial distance of the connectors according to local circumstances. It is also an advantage if the cables are fastened to the tube connectors with at least some pivoting movement to prevent buckling of the cables at these connecting points. The same is accomplished when the cables pass through the spacers via inserted sockets, etc.

Starting from a flexible tube of the above named type, the solution of the problem according to the invention deviates from the above solutions in that at mutually equal distances rings or ring segments are inserted from radially outside or inside into the flute valleys of the tube, that each ring or ring segment as well as each tube connector carries, without contact, at two diametrically opposite sides and at their side away from the tube a retaining element, in that adjoining rings or ring segments and their adjoining tube connectors are turned at an angle of 90° in relation to each other, that such retaining elements of adjoining rings or ring segments or ties looping without contact around the rings or ring segments and adjoining the tube connectors are connected to each other, and that the ties are tiltably hinged to the retaining elements.

With this solution, adjoining tube cross-sections are mutually gimbal-supported, with the support being effective in the direction of a lengthwise extension and a lengthwise shortening of the tube, thus covering cases of internal as well as external pressure brought to bear on the tube.

Furthermore, the above described support arrangement of the tube can be installed outside as well as inside the tube, and the term "flute valley" refers to the direction in which it happens to be observed. What appears as a flute valley when seen from outside the tube appears as a flute peak when seen from within, and vice versa.

The above described solution allows for unlimited movability of the tube in all directions. Otherwise, this solution is based on another principle as that described in the beginning, but it utilizes the same approach of the invention by providing the tube with an articulated support mantle whose flexibility is such that no axial relative movements between tube and support mantle are possible, i.e. that no frictional stress can occur.

As far as the ties or connectors are concerned, these are preferably designed in rigid form to be practically useful. However, for tubes under internal pressure the ties can, of course, also be designed as flexible cables or cable segments, but in that case other means must be provided to ensure that they loop around the tube without contact.

The ties can be formed by tapes either surrounding the tube or running inside the tube enclosed between two adjoining rings or ring segments, with the tapes on the side away from the tube running through guide channels provided at the retaining elements while they are tiltably supported against the retaining elements. The tiltable axial support of the tapes at the retaining elements can be provided by concave cradle surfaces formed by the retaining elements.

All solutions according to the invention are, as mentioned, characterized in that the components used are not subject to frictional stress. And the cables, rings and ties have no function as far as the internal or external pressure is concerned that has to be absorbed by the tube. They only serve the purpose of bracing the forces brought to bear in axial direction as the result of internal or external stress, and of bracing the tube against lateral buckling. It has been shown that the life expectancy of a tube according to the invention in terms of reversed bending stress is considerably higher than that of initially described known constructions, with the increase in life expectancy sometimes reaching the magnitude of several times the power of ten.

Other significant features and details of the invention are given in the following description of embodiments illustrated by the drawings.

DRAWINGS

FIGS. 1 and 2 show partial lateral and axial views of a tube with external support and a tube with internal support.

FIGS. 3-6 show versions of the construction whose principle is shown in FIG. 1.

FIG. 17 shows a version of the construction according to FIG. 1 whose principle applies also to the construction according to FIG. 2.

FIGS. 18-22 show a version according to FIG. 1 and its details in various views.

FIGS. 23 and 24 show a special construction in lateral and sectional view along sectional line VI—VI in FIG. 23.

DETAILED DESCRIPTION

Figure 5:
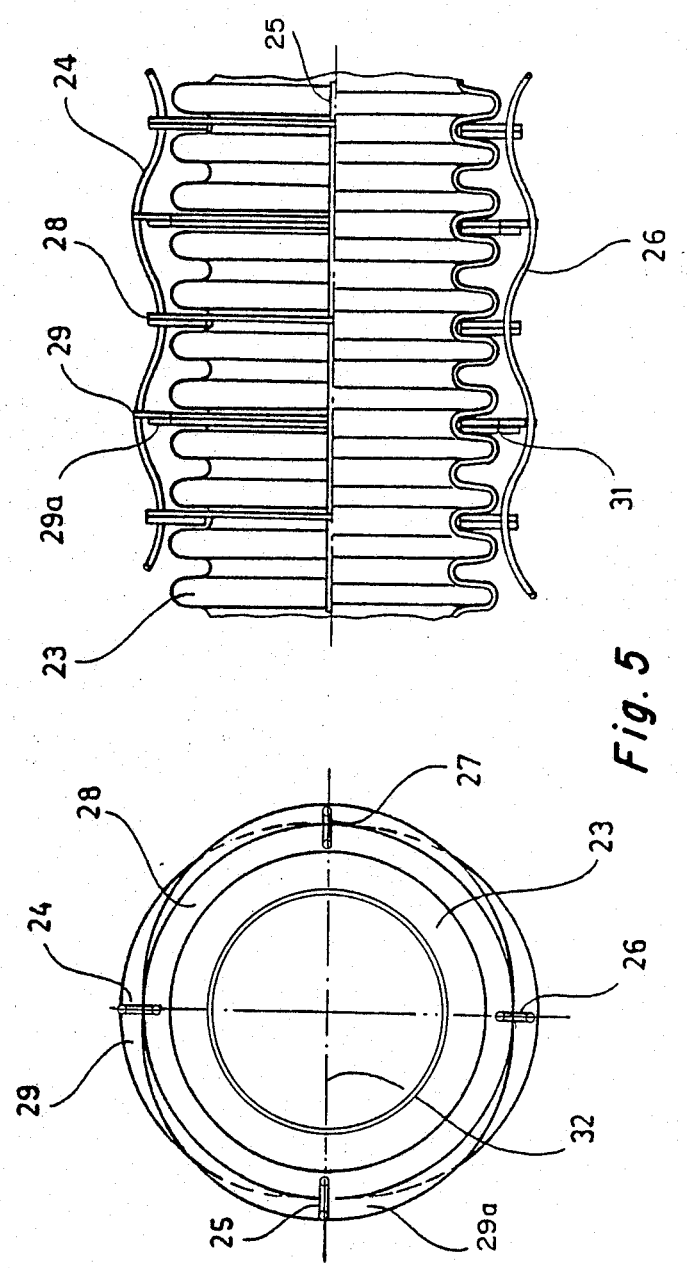

FIG. 1 (right) shows a partial lateral view of a corrugated tube 1 starting at a connector 2. Another such connector has to be imagined at the right end of the tube, where the construction corresponds exactly to the construction shown for the left end.

Into the flute valleys of corrugated tube 1 are inserted spacers 3 looping around the tube, and cables 4 and 5 which run parallel to the tube on opposite sides of same and which are fastened at 6 to connectors 2 of tube 1.

Cables 4 and 5 lie in the tube's neutral plane which is referred to in the left view of FIG. 1 as number 7. This arrangement in the neutral plane means that when the tube is bent along this plane, cables 4 and 5 are geometrically subject to a pure bending stress, because the individual tube cross-sections tilt about their axis referred to as number 7. Thus cables 4 and 5 hold connectors 2 of the tube at a constant, predetermined distance in terms of their axis.

Since in the neutral plane the length of tube 1 remains constant as well, no relative frictional movement can take place between tube 1 and cables 4 and 5, so that frictional stress and wear cannot occur, regardless of whether there is contact between tube 1 and cables 4,5 or not.

As FIG. 1 shows, spacer 3 is formed by an appropriately bent wire of circular cross-section whose free ends hook behind cable 4, thus captively closing the connection between tube 1, cables 4,5 and spacer 3. Of course, numerous other versions of spacer 3 are possible instead of the form shown in FIG. 1, provided that they serve the function explained by means of the example shown in FIG. 1. One such version, for example, is a spacer formed by semicircular, disk-shaped segments which cross cables 4,5 at end holes and which are inserted alternately from one or the other side of tube 1 into adjoining flute valleys. It is therefore not necessary to have a completely encompassing spacer in each flute valley.

As far as cables 4 and 5 are concerned, these can be smooth rods or clusters of wires or fibers. But it is also possible to use tapes or bundles of tapes, or chains consisting of an articulated assembly of links which can have their own bending strength. The possible variations thus described also apply in principle to all embodiments described by means of the other figures, and this question will therefore be discussed again specifically for those cases.

Contrary to FIG. 1, FIG. 2 shows an axial support of a tube 8 arranged internally in tube 8. This tube 8, too, has at its ends connectors 9 to which in neutral plane 10 are fastened two mutually opposite cables 11, 12.

Cables 11,12 are guided through spacers 13 which are semicircular in shape and inserted from inside into the flute valleys of corrugated tube 8. In this case the arrangement is such that spacers 13 running in opposite direction are arranged in staggered fashion about a flute valley. Of course, the distances can be larger, too, when this is sufficient for the appropriate guidance of tube 8 in relation to cables 11,12.

As shown, cables 11,12 can abut against the internal rims of corrugated tube 8, but this does not lead to any frictional relative movement, since cables 11 and 12 lie in the neutral plane 10. But for practical purposes, provision can be made for cables 11 and 12 to be at a slight distance from the internal contour of tube 8.

In comparison with FIG. 1, FIG. 3 shows a modified embodiment with a corrugated tube 14 and cables 15,16, designed in this case as bundles of tapes, as shown particularly in the axial views of FIG. 3 (left).

Spacers 17 are designed as semicircular hoops which are inserted from outside into the flute valleys of tube 14 and which hook behind cables 15,16. Similarly to the example in FIG. 2, reversely bent hoops 17 are arranged alternately in adjoining flute valleys.

FIG. 4 is an example of how—again arranged alternately in adjoining flute valleys with reverse bending—into the flute valleys of a corrugated tube 18, slack retaining elements 19 are inserted which loop around cables 20,21. Between retaining elements 19, spacer pieces 22 are inserted into the flute valleys to brace cables 20,21 radially toward the inside against tube 18. In this case, too, cables 20,21 lie in the neutral plane 23.

In the examples according to FIGS. 1-4, each spacer is inserted into the flute valleys of the corrugated tube. Of course, it is also possible to place the spacers on the flute peaks. But in that case it is necessary to form-fit the spacers appropriately either to the cable or to the tube such that they cannot shift in axial direction. An example of this will be explained in relation to FIG. 17.

According to FIG. 5, symmetrically distributed around a corrugated tube 23 are four cables 24,25,26,27 which run through spacers 28 that can be formed by semicircular, disk-shaped ring segments and that are inserted at equal distances into the flute valleys of the tube in axial direction.

Between spacers 28 are pairs of retaining elements 29,29a which are provided with external notches for inserting cables 24-27, but in this case the cables are at a greater distance from the tube axis than spacers 28. Furthermore, retaining elements 29,29a have a free internal cross-section 31 which in relation to the adjoining wall of tube 23 forms a notable distance for retaining elements 29,29a.

In addition, the arrangement is such that retaining elements 29,29a hold only the cables that are diametrically opposite each other, while they move freely in radial direction in terms of the other cables. In this case, retaining elements 29 hold cables 24 and 26, while retaining elements 29a hold cables 25 and 27. The radial freedom in relation to the cables not held is achieved—as shown in FIG. 5 (left)—by recessing the external cross-section of retaining elements 29,29a.

This leads to a construction that allows tube 23 to be flexible on all sides. If one considers, for example, plane 32 as the neutral plane and imagines the tube with its outer ends bent down in relation to the right half of FIG. 5, the result is that retaining elements 29 shift radially downward in relation to tube 23, since with such bending the distance between the upper ends of the connectors (not shown) becomes greater, while the distance between the lower ends becomes smaller. Similarly, the above mentioned shift of retaining elements 29 can cause cable 24 to stretch, while cable 26 is fluted more at the same time, but the curved retaining function of cables 24 and 26 via spacers 28—which is equidistant to cables 25 and 27—is not lost.

The above mentioned shift of retaining elements 29 is not impaired by cables 25 and 27, since the retaining elements 29 are free in relation to these cables.

In all other neutral planes, conditions are similar; sometimes there is a combination of conditions. In these cases, too, the important thing is that no tribological stress occurs.

In the construction shown in FIG. 5, four cables 24–27 are provided. For the sake of completeness it should be mentioned that the described ability to function can be achieved with appropriate structural modifications even when only two or three cables are used.

Figure 6:
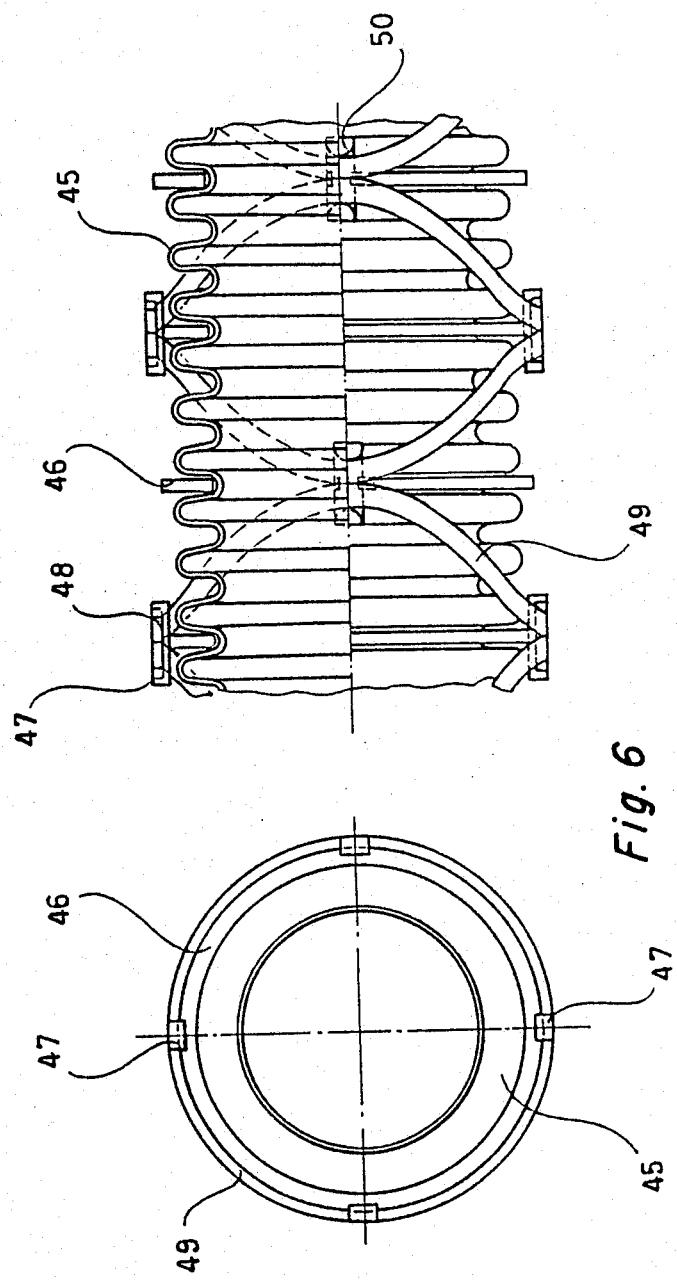

FIG. 6 shows a version where a corrugated tube 45 is supported externally. It deviates in principle from the comparable constructions discussed above which were characterized by cables that extended largely parallel to the tube. But otherwise the approach in solving the problem is the same.

According to FIG. 6, rings 46 are again inserted at axially equal distances into the flute valleys of tube 45. But these now contain retaining elements 47 opposite each other, with adjoining rings 46 arranged in mutually staggered fashion and at an angle of 90° to retaining element 47. Retaining elements 47 have guide channels 48 radially open to the outside into which ties 49 are inserted which are formed as tapes of rectangular cross-section which loop around adjoining rings 46 between retaining elements 47. The tapes are arched such that they loop around tube 45 without contact.

The ties 49, as described, are stiff in axial direction of tube 45 in terms of the tube's tendency to extend in length as well as in terms of its tendency to shorten, so that they form an axial support in case of either internal or external pressure brought to bear on tube 45.

Further, the construction shown in FIG. 6 provides gimbal-support for tube 45, allowing it to be bent in all directions without being able to buckle sideways.

Frictional stress does not occur. To allow the free movement between retaining elements 47 and ties 49 during bending, the axial support of ties 49 at retaining elements 47 is provided by convex cradle surfaces 50 which is formed by them.

When the case shown in FIG. 6 is regarded only in terms of internal stress exerted on tube 45, ties or retaining elements 49 can, for example, also be formed as cabled or cable segments connecting retaining elements 47 with each other. The important thing in this case is that ties 49 can swivel in relation to retaining elements 47 either because of their flexibility or due to rotatable mounting, or similar means.

Moreover it should be noted that rings 46 may be replaced by ring segments which only partly loop around the tube with retaining elements 47, since these are practically braced against a shift in peripheral direction by ties 49.

Figure 7:
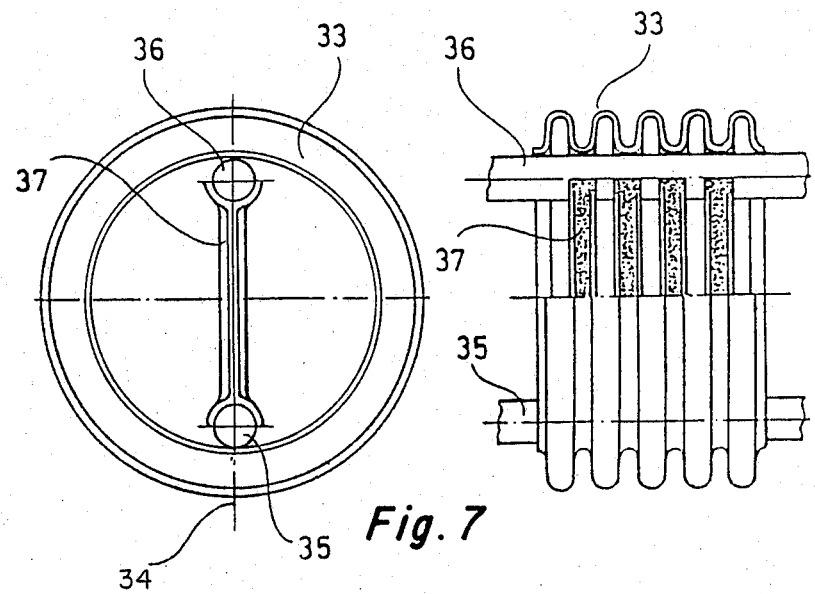
FIGS. 7-8 show versions of the construction whose principle is shown in FIG. 2.

FIG. 7 shows a different version of an internal support for a tube 33 via cables 35, 36 arranged in neutral plane 34 diametrically opposite each other. In this case the cables are braced by webs 37 extending through the cross-section of the tube and holding cables 35, 36 by means of semicircular hollow recesses at their ends. With this construction it is, of course, necessary to ensure that webs 37 are fixed in relation to cables 35, 36, i.e. that they cannot slip in axial direction. Otherwise, cables 35, 36 abut against the internal rims of tube 33 which, however, does not lead to frictional stress, since—as mentioned—the cables lie in neutral plane 34. Another example of the internal support of a corrugated tube 38 is shown in FIG. 8, where again the connectors of the tube are not illustrated. Here, cable 39 is arranged coaxially to tube axis 40 and is held in that position in relation to the tube by cross-shaped lateral braces 41 which abut against flute valleys of the tube in two diametrically opposite sectors 42, 43. Lateral braces 41 which adjoin in axial direction of the tube are arranged such that they are turned by 90° in relation to each other. Thus it is possible to tilt lateral braces 41 in relation to cable 39 during assembly and to erect them only after inserting them into the tube opening. To facilitate this tilting action further, central aperture 44 of lateral braces 41 through which cable 39 runs can have a slightly greater cross-section than that of cable 39.

Figure 8:
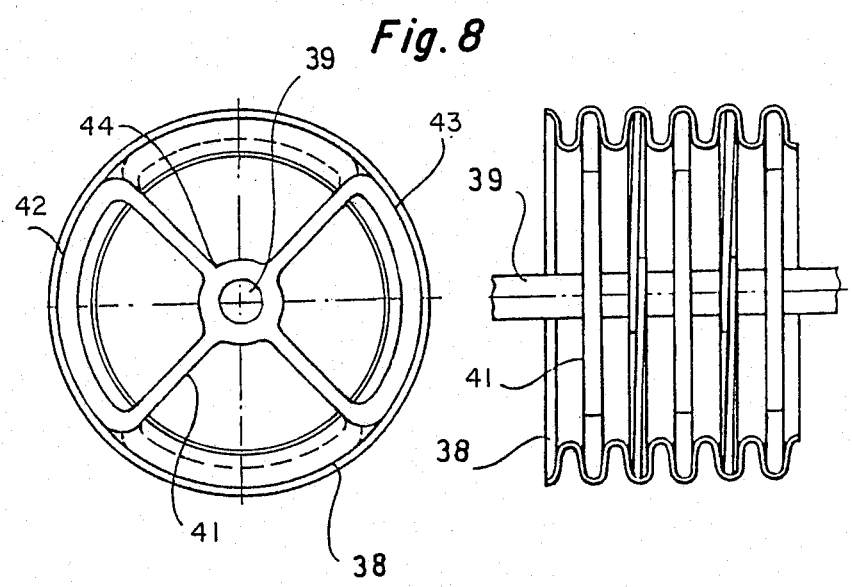

The construction shown in FIG. 8 also results in tube 38 being flexible in all directions, since cable 39 always lies in the neural plane due to its arrangement. In this case, too, the construction can be such that the outer parts 42, 43 of lateral braces 41 sit on the inward-turned tube rims; however, in this case the possibility of axial displacement must be prevented by form-fitting or similar means.

FIGS. 9–13 show enlarged, partial axial views of different constructions of spacers, all of which are shown in connection with a corrugated tube 51 and a cable 52, numbered the same in all these figures.

Figure 9:
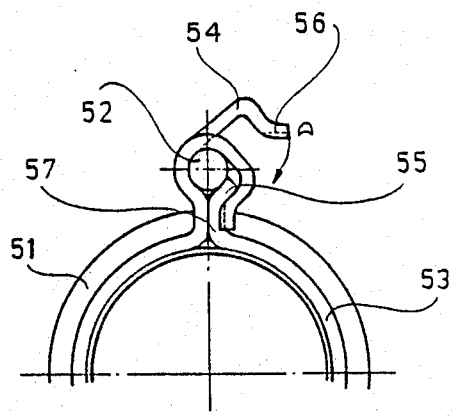
FIGS. 9-13 show versions of a detail from FIG. 1, in partial axial view.

FIG. 9 shows an open wire ring of circular cross-section whose one end 54 is looped around cable 52 and tilted over the other end 55 from outside, with channel 56 running along end 54 being able to accomplish a form-fit with end 55. Ends 54, 55 also form a radially extending brace 57 with the purpose of holding cable 52 at a distance in relation to the external contour of tube 51.

Figure 10:
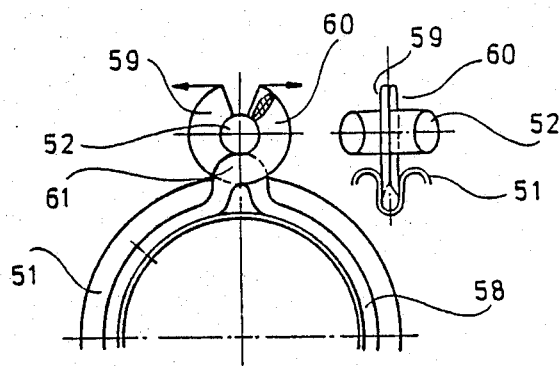

FIG. 10 shows a spacer in the form of a wire ring 58 of circular cross-section whose free ends 59, 60 hook behind cable 52 and which is therefore held closed by cable 52. To hold cable 52 at a radial distance in relation with the external contour of tube 51, ends 59, 60 are designed with a serpentine contour which when closed forms a hump 61 against which cable 52 abuts. The illustration in FIG. 10 (right) shows a view turned at an angle of 90° and demonstrates that ends 59, 60 are flattened, starting from the cross-section of wire ring 58.

Figure 11:
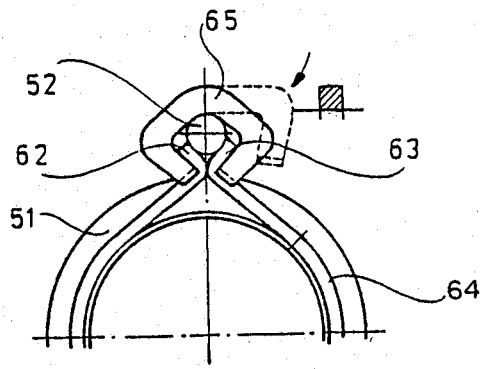

According to FIG. 11, the free ends 62, 63 of a wire ring 64 are held together by clamp strap 65 which embraces cable 52 and is of rectangular cross-section.

Figure 12:
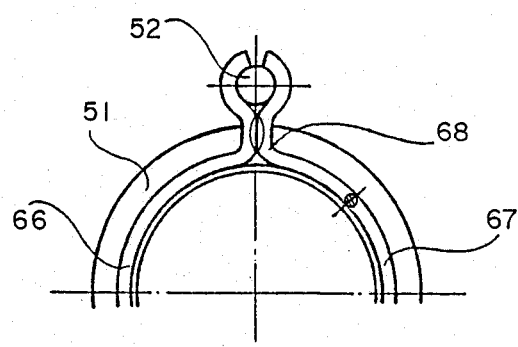

FIG. 12 shows an example in which the spacer is formed of wire ring halves 66, 67 of circular cross-section. The ends of the ring halves form a radial brace 68 at which they are welded together. Starting from this brace, the ends of the ring halves hold cable 52.

Figure 13:
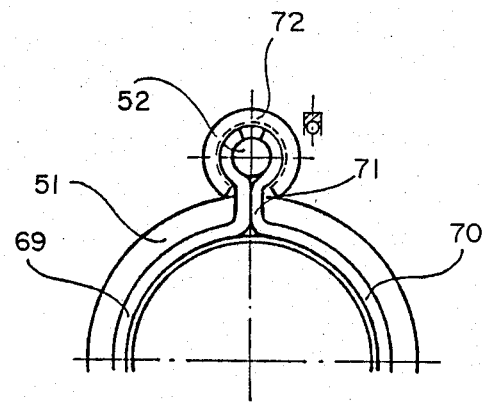

FIG. 13 shows a version comparable to that in FIG. 11, where the wire ring halves 69, 70 again form a radial brace 71 and loop around cable 52 with their ends. A clamp strap 72 is pulled over from the side to hold ends 69, 70 together.

FIGS. 9–13 show examples of simple construction designs for the spacer, as well as simple, in some cases removable assembly means.

Figure 14:
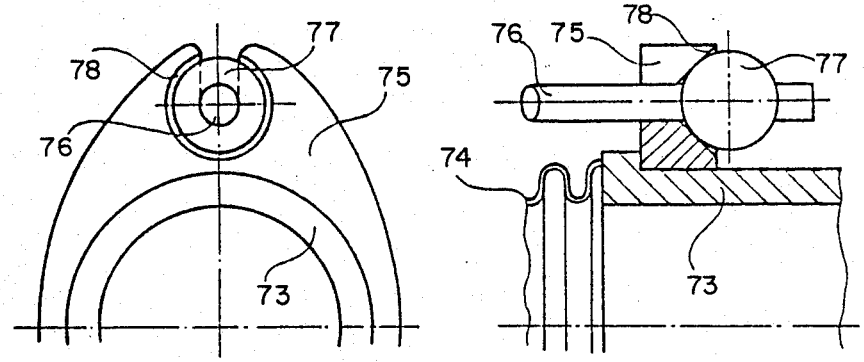
FIGS. 14-16 show embodiments of a further detail from FIG. 1, in a partial radial view and in axial view.
Figure 15:
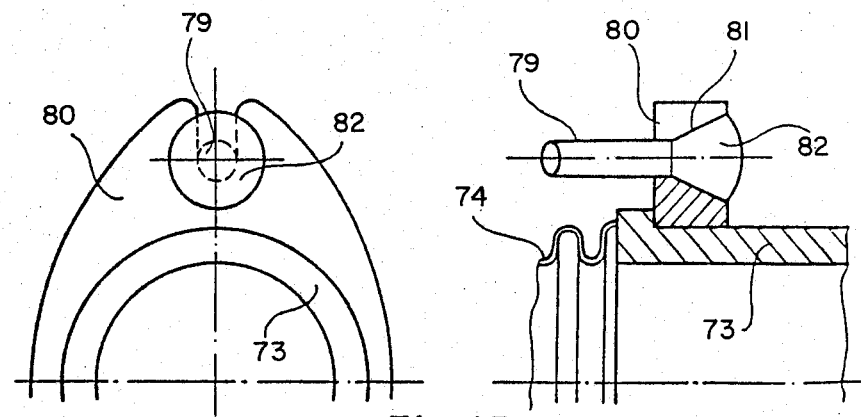
Figure 16:
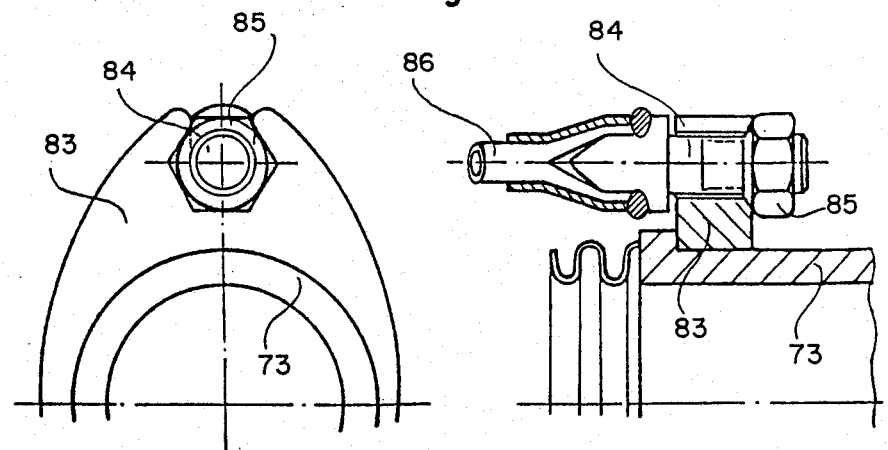

FIGS. 14–16 show examples of how the cable can be joined to connector 73 of a tube 74.

According to FIG. 14, a retaining ring 75 is placed onto connector 73, and cable 76 runs through said retaining ring 75. Outside the tube, cable 76 is formed with ball 77 which abuts against pan-shaped contact surface 78 of ring 75. Thus cable 76 is able to perform limited swivel movements in relation to ring 75.

A similar support, but without the possibility of a swivel movement, is shown in FIG. 15, where cable 79 runs through ring 80 which sits on connector 73 and against whose cone-shaped contact surface 81 it abuts via cone-shaped recess 82.

FIG. 16 shows a cable fastening means that is adjustable in axial direction. Here, onto connector 73 is placed ring 83 which contains screw bolt 84 which is supported against ring 83 via a nut 85. To the other end of the screw bolt, cable 86 is welded which—as shown—has been split for this purpose.

Of course, FIGS. 14–16 can represent only a few examples of the means to fasten the cable to the connectors. Taking FIG. 8 as an example, the connector would have to be provided with a fastening means for ties 49 which correspond to retaining element 47.

FIG. 17 shows a version according to the solution shown in FIG. 1 for an externally braced tube 90, where an internal bracing could be provided in a comparable manner.

According to FIG. 17, tube 90 is accompanied on the outside by two diametrically opposite cables 91, 92 onto which rings 93 are threaded through holes in radial braces 94 which lie at a distance 95 from each other. To form an maintain distance 95, sockets 96 are threaded onto cables 91, 92 between adjoining braces; the adjoining braces 94 are supported against sockets 96.

Rings 93 have a smoothly cylindrical internal contour 97 which preferably has a slightly greater diameter than the external contour of tube 20. In this manner, corrugated tube 90 is provided with an articulated support tube whose links formed by rings 93 during bending of the tube in relation to neutral plane 98 in which cables 91, 92 are situated, enlarge their mutual distance on the outside of the bend and reduce it on the inside, while the tube abuts against rings 93 on the outside of the bend without the possibility of relative movement between tube and rings.

A corresponding construction can easily be imagined inside the corrugated tube, the difference consisting only in the circumstance that the rings have the smoothly cylindrical contour facing the tube on their outside, while otherwise leaving free passage in the cross-section for the medium carried.

In FIG. 17, rings 93 are threaded parallel to each other onto cables 91, 92. One version, for example, is easily possible in that a tape with the contour of rings 93 is threaded in screw-fashion around the tube, while the individual threads are at an axial distance from each other. The form-fitting engagement with the cables can in this case be produced such that the tape which is threaded in screw-fashion is axially compressed and provided on the opposite side with a groove that is machined from the outside when the tape is pulled apart.

FIG. 18 shows an unsupported, flexible metal tube that consists primarily of a highly flexible, accordion-like corrugated tube 100, made of steel or other metal, whose wall thickness depends on the pressure it has to be charged with and on the desired degree of flexibility. At each end of tube 100, a connector 101 is provided with which the tube can be connected to a pressure line or pressure device.

FIG. 19 shows the corrugated tube of FIG. 18 in which, in order to absorb axial loads, the two connectors 101 are rigidly connected with two cables 102 lying at opposite sides. Cables 102 may consist of single wires, multiple wires or tapes. To support ring-shaped flutes 103 against buckling under internal pressure, spacers 104 are provided in the form of support rings, each of which is arranged in a flute valley 105 of tube 100.

FIG. 20 shows such a support ring 104 in top view. Support rings 104 which may have a round, polygonal or elongated cross-section, consist of two ring halves 106 and 107, each of whose ends 108 has a hole 109. The ring halves 106 and 107 are laid in pairs around each flute valley 105, and cables 102 are threaded through holes 109.

FIG. 21 shows such a ring segment 106. Support rings 104 can be made as wire-like or flat rings e.g. of sheet metal of 0.1 to 1 mm thickness, preferably under 0.5 mm thickness. Instead of being arranged in flute valleys 105, the support rings can also abut against external periphery 103. A simple version consists of thin metal plates that are easy to manufacture. One ring segment 106, 107 can be stamped in one operation together with holes 109.

To prevent the overstretching of individual flutes of tube 100 where bending occurs, support rings 110 (FIG. 22) can in their free areas, i.e. at sides 111 or 112 of tube 100 where pulling and pressure occurs, be provided with spacing elements 113. These spacing elements 113 ensure that the flutes participate evenly in the overall bending of the tube in terms of the maximum admissible bending angle. Spacers 113 can form part of the metal ring halves and can be stamped in the same operation. Spacing elements 113 are relatively short flaps to prevent them from impairing the required bending radius and are located about 90° from said holes 109.

In the versions shown in FIGS. 18–22, two diametrically arranged cables 102 are provided and connected with the two connectors 101. This design allows bending only in a plane 114 that runs perpendicularly to plane 115 which leads through the two rods 102 or the cables.

FIG. 23 shows another construction in which corrugated tube 116 is flexible in all directions. In this version, the spacers in the form of support rings 104 are provided only in certain areas. In FIG. 23, for such areas 117–120 are shown. At each joint between the adjoining areas 117–120, an outer ring 121 is provided that serves the purpose of retaining in this case several short cables 122–125 and of transferring the axial forces from one cable to another.

Figure 24:
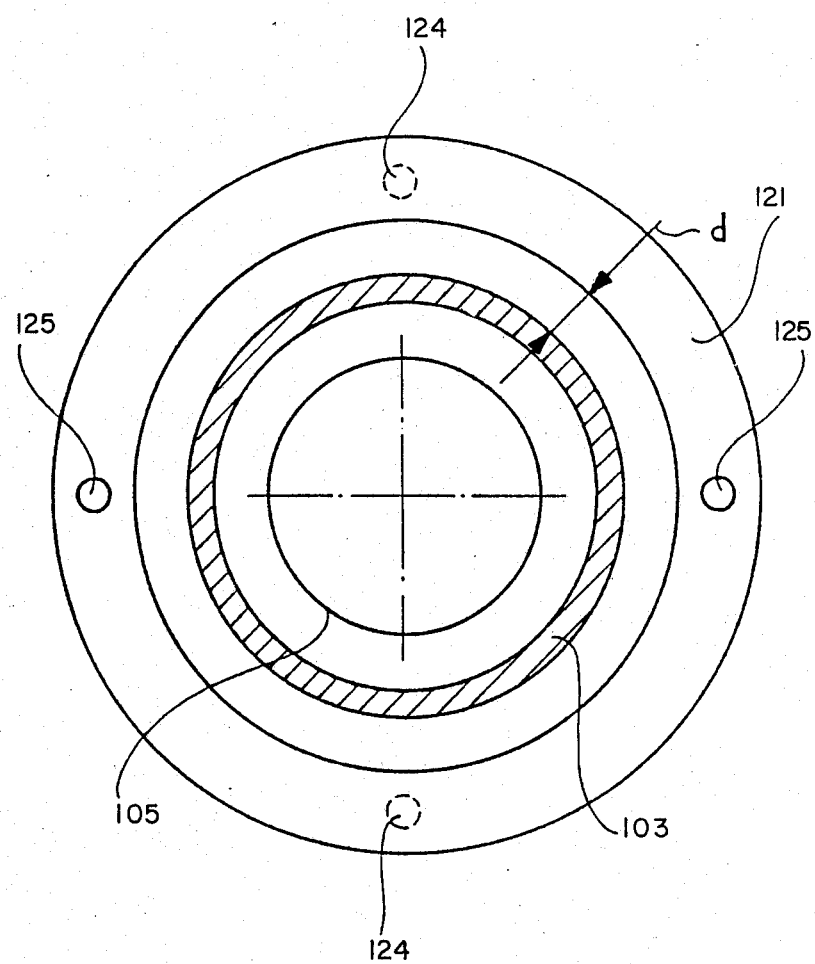

FIG. 24 shows a cross-sectional view along cross-sectional line VI—VI in FIG. 23 through area 120 of FIG. 23. For example, the section leads through an outer flute 103. Around outer flute 103, outer ring 121 is arranged such that between the outer periphery of outer flute 103 and the inner periphery of outer ring 121, a gap (d) remains. Gap (d) may be a few tenths of a millimeter in width. At the side of outer ring 121 that can be seen in FIG. 24, the two cables 125 of area 120 are fastened to outer ring 121; they are arranged opposite each other. At an angle of 90° to these, cables 124 are connected at the back of outer ring 121 for the adjoining area 119. The connection between cable and outer ring 121 can be a simple solder. From each area 117-120 to the adjoining area, the cables always are turned by 90°. This has the effect that for each bend of corrugated tube 116, at least some of the areas 117-120 can follow the bend, since no mantle line of corrugated tube 116 lies completely opposite a single cable.

In the position shown in FIG. 23, the cable pairs 122 and 124 lie in the same plane as the paper. Thus the areas 117 and 119 provided with these cable pairs 122, 124 cannot follow any bending in this plane. But the intermediate areas 118 and 120 can be bent, and cable pairs 123, 125 lying in a plane perpendicular to the neutral plane are not subjected to pulling stress, only to bending stress. Due to gap (d), the deformation in the transitional areas within outer rings 121 can continuously and without hindrance pass into the non-deformed area, as shown at the interface between areas 117 and 118.

A similar situation occurs when bending takes place perpendicular to the plane of the drawing. In all other directions, all areas 117-120 participate more or less, especially since in these cases there are no cables in the neutral plane.

The sequence or the distance of outer rings 121 depends on the area of application. In flute valleys 105 adjoining an outer ring 121, no support rings 104 are provided to allow outer ring 121 to slide over adjoining flute valley sectors.

Such tubes are used as corrugated tubes for pipes charged with internal pressure and as lateral and angular compensators.

The flexibility of the corrugated tube can be increased by designing holes 109 of the ring halves as elongated slots with radial direction.

We claim:

1. Flexible thin-walled tube (1, 100) with mutually parallel ring-shaped flutes (105), end connectors (101) and longitudinal support means which hold said connectors against changes in axial spacing and which are securely joined to said connectors in the direction of at least one of: pull, pressure, and against which the tube is at least indirectly braced, wherein the longitudinal support means include at least two cables (4, 5; 102) extending generally parallel to the tube, arranged symmetrically about the tube axis and located externally of the tube and guiding said tube in radial direction;

and including spacers (3, 104) determining the relative position between the tube and said cables and holding the cables at intervals along the length of the tube, said spacers including rings (104) which, each, comprise ring segments (106, 107) captively enclosing the tube and retaining said cables, the ring segments being formed with aligned holes (109) at respective ends and through which the cables (102) are placed to hold the ring segments in opposed position, in pairs, and thereby form said rings.

2. The tube of claim 1, wherein said ring segments comprise self-supporting essentially stiff material.

3. The tube of claim 1, wherein said holes (109) are formed as radially directed longitudinal slots.

4. The tube of claim 1, wherein said ring segments are part-disk elements.

5. The tube of claim 1, wherein said ring segments comprise thin, flat sheet metal.

6. The tube of claim 6, wherein the thickness of the sheet metal of the ring segments is between 0.1 mm and 1 mm.

7. The tube of claim 6, wherein the thickness of the ring segments is less than 0.5 mm.

8. The tube of claim 1, wherein said ring segments comprise wire of essentially circular cross section.

9. The tube of claim 1, further including spacing projections (113) extending essentially axially with respect to the length of the tube, and extending from said ring sections to limit the bending radius of said tube.

10. The tube of claim 9, wherein said spacing projections (113) are positioned at about 90° offset with respect to said holes (109).

11. The tube of claim 9, wherein said ring segments comprise sheet metal elements;

and said spacing projections comprise projecting flaps stamped from and integral with said sheet metal segments.

12. The tube of claim 1, further including means (75, 77, 80, 81, 82, 83, 84, 85) releasably and adjustably connecting the cables (76, 79, 86; 102) to said connectors (2, 73).

13. The tube of claim 12, wherein said attachment means permit limited rotational movement between said cables and said connectors.

14. The tube of claim 1, further including sleeves or collars surrounding the cables where they pass through the holes (109) of said ring segments.

* * * * *